G. W. LANCASTER.
SAFETY SHUTTER.
APPLICATION FILED MAR. 3, 1916.

1,244,215.

Patented Oct. 23, 1917.
8 SHEETS—SHEET 1.

Fig. 1

Witnesses
R. M. Jones
H. F. Riley

Inventor
G. W. Lancaster
By A. Randolph Jr.
Attorney

G. W. LANCASTER.
SAFETY SHUTTER.
APPLICATION FILED MAR. 3, 1916.

1,244,215.

Patented Oct. 23, 1917.
8 SHEETS—SHEET 5.

G. W. LANCASTER.
SAFETY SHUTTER.
APPLICATION FILED MAR. 3, 1916.

1,244,215.

Patented Oct. 23, 1917.
8 SHEETS—SHEET 8.

Inventor
G. W. Lancaster

Witnesses

By
Attorney

UNITED STATES PATENT OFFICE.

GEORGE W. LANCASTER, OF RICHMOND, VIRGINIA, ASSIGNOR TO CENTRAL DEVELOPMENT COMPANY, OF RICHMOND, VIRGINIA, A CORPORATION OF VIRGINIA.

SAFETY-SHUTTER.

1,244,215.     Specification of Letters Patent.     Patented Oct. 23, 1917.

Application filed March 3, 1916. Serial No. 81,986.

*To all whom it may concern:*

Be it known that I, GEORGE W. LANCASTER, a citizen of the United States, residing at Richmond, in the county of Henrico and State of Virginia, have invented certain new and useful Improvements in Safety-Shutters; and I do hereby declare the following to be a full, clear, and exact description of the invention, such as will enable others skilled in the art to which it appertains to make and use the same.

The invention relates to improvements in safety shutters.

The object of the present invention is to improve the construction of safety shutters and to provide a simple, practical, and efficient safety shutter of strong and durable construction designed for use on houses, apartments, factories and various other buildings where shutters are used and adapted to afford a fire-proof and burglar proof closure.

A further object of the invention is to provide a safety shutter of this character equipped with a screen and provided with slats slidably mounted within a hinged frame so that the shutter may be swung open or the slats moved upwardly to open the window without swinging the shutter to its open position.

Another object of the invention is to provide a safety shutter adapted to close against or substantially against one another and capable also of ready adjustment on an axis to provide an intervening space between the slats of the desired size to afford the necessary ventilation or light without swinging the shutter to an open position or sliding the slats upwardly.

Another object of the invention is to provide an easily operable, strong and secure locking means for firmly securing the pivotally and slidably adjustable slats in their closed position.

It is also an object of the invention to provide a safety shutter adapted to be readily applied to the exterior of an ordinary window frame or casing and equipped with means for covering the exterior thereof so as to render the same fire-proof when the shutter is closed.

With these and other objects in view the invention consists in the construction and novel combination and arrangement of parts hereinafter fully described, illustrated in the accompanying drawings and pointed out in the claims hereto appended, it being understood that various changes in the form, proportion and minor details of construction may be resorted to without departing from the spirit or sacrificing any of the advantages of the invention.

In the drawings—

Like numerals of reference designate corresponding parts in the several figures of the drawings.

Figure 6:
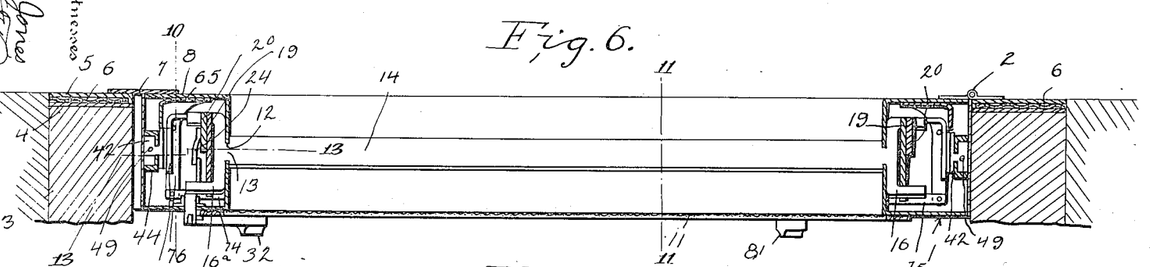
Fig. 6 is a horizontal sectional view on the line 6—6 of Fig. 2.

In the accompanying drawings in which is illustrated the preferred embodiment of the invention, the safety shutter comprises in its construction, a rectangular or oblong frame 1 connected by suitable hinges 2 to an outer supporting frame suitably secured to the window frame or casing 3 and composed of inner and outer plates 4 and 5 of sheet metal or other suitable material and an interposed layer 6 of corrugated asbestos or other suitable material to form a fire-proof casing or covering for the wooden window frame or casing 3 so that when the safety shutter is applied to an ordinary window frame or casing it will render the window both fire-proof and burglar proof as hereinafter fully explained. The casing or frame for protecting the wood-work of the window may of course be varied as will be readily understood and hinges of any desired character may of course be employed for mounting the safety shutter on the supporting frame. The hinged side of the safety shutter is adapted to fit tightly against the window frame or casing as illustrated at the right hand side of Fig. 6 of the drawings and the shutter frame is provided at the opposite side with a projecting flange 7 to cover the intervening space between the free edge of the safety shutter and the window frame or casing so that a perfectly tight closure will be effected when the safety shutter is in its closed position.

Figure 1:
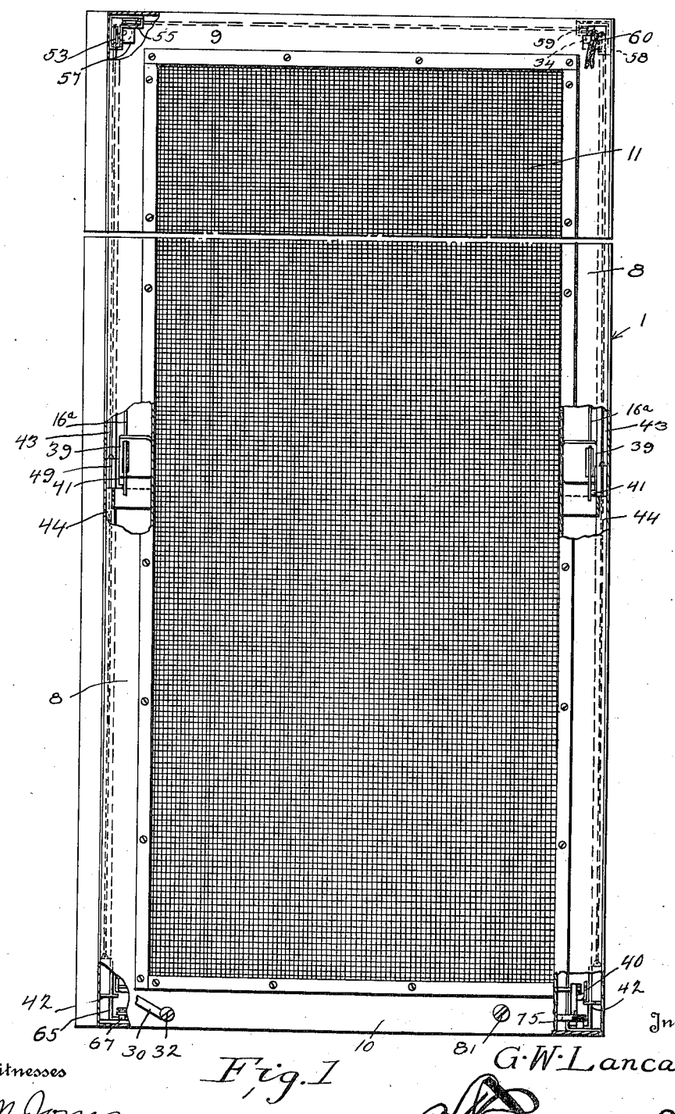
Figure 1 is an elevation partly in section showing the inner side of a safety shutter constructed in accordance with this invention.
Figures 2, 3, 25:
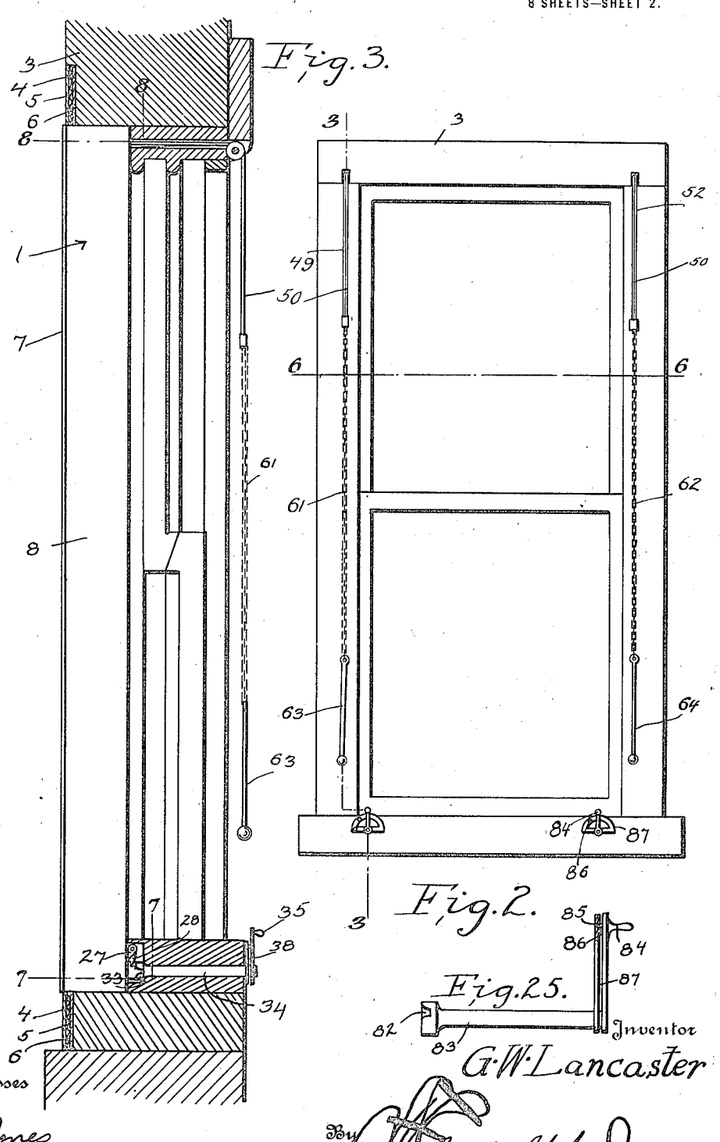
Fig. 2 is a similar view on a reduced scale showing the safety shutter from the interior of a room.
Fig. 3 is a vertical sectional view on the line 3—3 of Fig. 2.
Fig. 25 is a detail view of one of the operating devices.
Figures 4, 5:
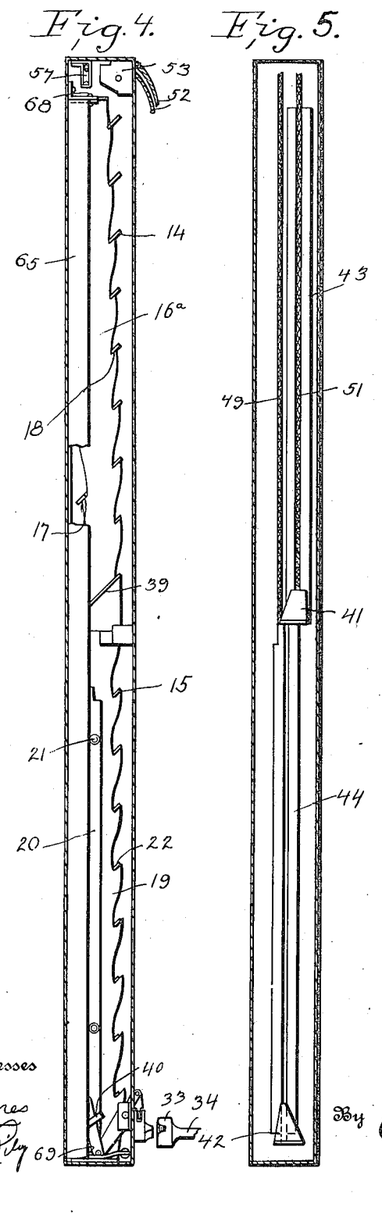
Fig. 4 is a vertical sectional view through one side of the safety shutter, the mechanism being shown in elevation.
Fig. 5 is a similar view looking in the opposite direction and showing the vertically slidable shoes and the guides for the same.
Figure 16:
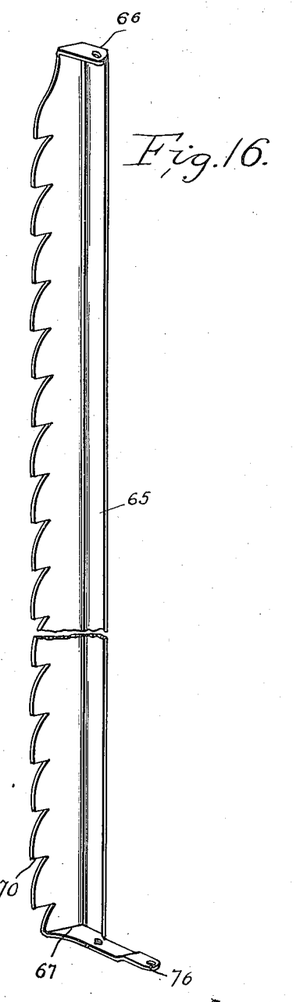
Fig. 16 is a detail perspective view of one of the locking bars.
Figure 19:
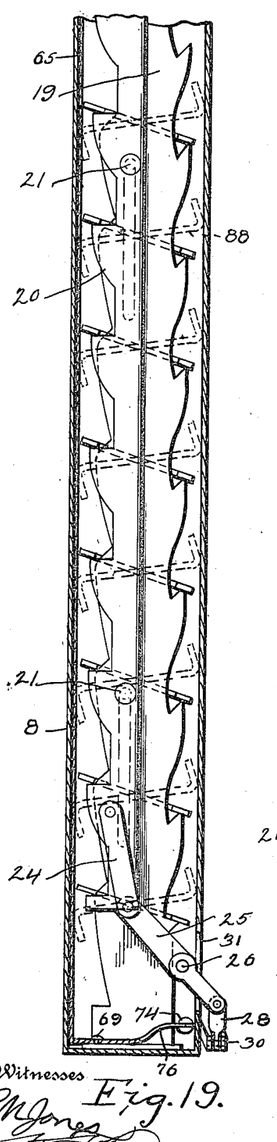
Fig. 19 is an enlarged detail sectional view of a modification of the invention showing a different form of shutter slat, the slats being open.

The frame 1 of the safety shutter is constructed of suitable metal and it is composed of vertical side casings 8 and top and bottom connecting casings 9 and 10 preferably of rectangular formation as shown and adapted to contain the mechanism for operating the shutter slats hereinafter fully explained. The shutter frame is provided at the exterior with a screen of suitable woven wire which may be secured to the frame of the safety shutter in any desired manner. The hollow sides or side casings of the shutter frame are provided with opposite vertical slots 12 for the reception of reduced portions 13 of upper and lower slats 14 and 15 similar in construction but preferably mounted as shown in the accompanying drawings in upper and lower series, the upper series being slidable upwardly and downwardly, and the lower series being both slidably and pivotally adjustable but both sets of the upper and lower slats may be mounted for the double adjustment as will be readily understood. The slats are provided at their ends with recesses 15ª forming substantially yoke shaped terminal portions 16ᵇ which as clearly illustrated in Fig. 16 of the drawings is set at an angle to the body portion of the slats. The shutter slats are shown flat in Figs. 1 to 18 inclusive of the drawings but they may be substantially Z-shaped or approximately S-shaped or sigmoidal as illustrated in Figs. 19 to 23 inclusive. The upper series of slats have their terminal portions or yokes slidably receiving vertical plates or bars 16 rigidly mounted within the sides of the shutter frame and constituting guides for the upper series of slats and provided at their inner and outer edges with seats 17 and 18 formed by recessing the edges of the bars or members 16ª and located at intervals and receiving the terminal portions of the slats at opposite sides of the end recesses when the slats are in their closed positions. The shoulders or seats are arranged in pairs and the members of each pair are disposed at different elevations, the outer seats or shoulders being below the inner seats or shoulders to arrange the slats at an inclination. The terminal portions of the slats are supported in an inclined position as clearly illustrated in Fig. 4 of the drawings when the slats are in their closed positions but owing to the angular relation of the body portion of the slats with the terminal yokes or portions thereof, the said body portions of the slats may be set at any desired angle or inclination when the terminal portions are arranged on the said seats. This will enable the slats when in their closed position to be either arranged at a slight interval or in substantial contact to provide the character of shutter desired. The lower series of slats have their terminal portions receiving lower vertical bars or members 19 which are provided with outer vertically slidable sections 20 having a slot and pin connection 21 with the fixed body portion of the bar or member 19 and slidable upwardly and downwardly with relation to the same. The fixed bar or portion 19 and the slidable section 20 are provided with shoulders or seats 22 and 23 formed by recessing the edges of the lower bars or members and their slidable sections and arranged in pairs, the members of each pair being located at different elevations to set the terminal portions of the slats at an inclination in the same manner as the ends of the slats of the upper series. The slidable mounting of the sections of the lower bars or members permit a pivotal adjustment of the slats of the lower series so that the slats may when in their closed position be in substantial contact to form a closed fire-proof shutter and may be adjusted from such position to open them to a greater or less degree as desired to afford ventilation or light. The slidable sections of the vertical bars or members of the lower series of slats are connected by links 24 with outwardly extending arms 25 of a transverse rock shaft 26 journaled in suitable bearings of the bottom casing or portion of the frame of the safety shutter and extending entirely across the same to arrange the arms 25 in position for connection with the slidable sections of both bars or members 19 of the lower set or series of slats. The transverse rock shaft 26 is also provided with an inwardly or rearwardly extending arm 27 which is connected by an exterior link 28 with a rock shaft 29. The rock shaft 29 which is journaled in suitable bearings of the frame of the safety shutter is provided with an exteriorly arranged arm 30 and the link 27 extends upwardly from the arm 30 to the arm 27 which passes through a slot 31 in the bottom portion or casing of the safety shutter frame. The rock shaft 29 is provided with an exterior head preferably tapered and flattened to form an engaging portion 32 which when the shutter is closed fits in a recessed head 33 of an operating shaft 34 journaled in suitable bearings of the window frame or casing at the bottom thereof and provided with an exterior operating handle 35. The operating handle 35 is preferably in the form of a crank located interiorly of the building to which the safety shutter is applied and is adapted to be actuated to partially rotate the operating shaft 34 to swing the arm 25 of the transverse rock shaft 26 upwardly and downwardly for raising and lowering the slidable sections of the lower members or plates of the bottom series of slats. Any suitable operating mechanism may of course be provided and any suitable means may be employed for securing the shutter slats in their pivotal adjustment. In the accompanying drawings, the operating crank or handle 35 is provided with a projection 36 which is adapted to engage any one of a series of depressions 37 of an arcuate plate 38. The plate may be of any desired shape and the depressions or recesses are located at spaced points to enable the desired adjustment of the slats to be obtained. The handle 35 has sufficient resiliency to enable the projection 36 to be sprung into and out of engagement with the depressions or recesses 37.

Figures 9, 17, 18, 24:
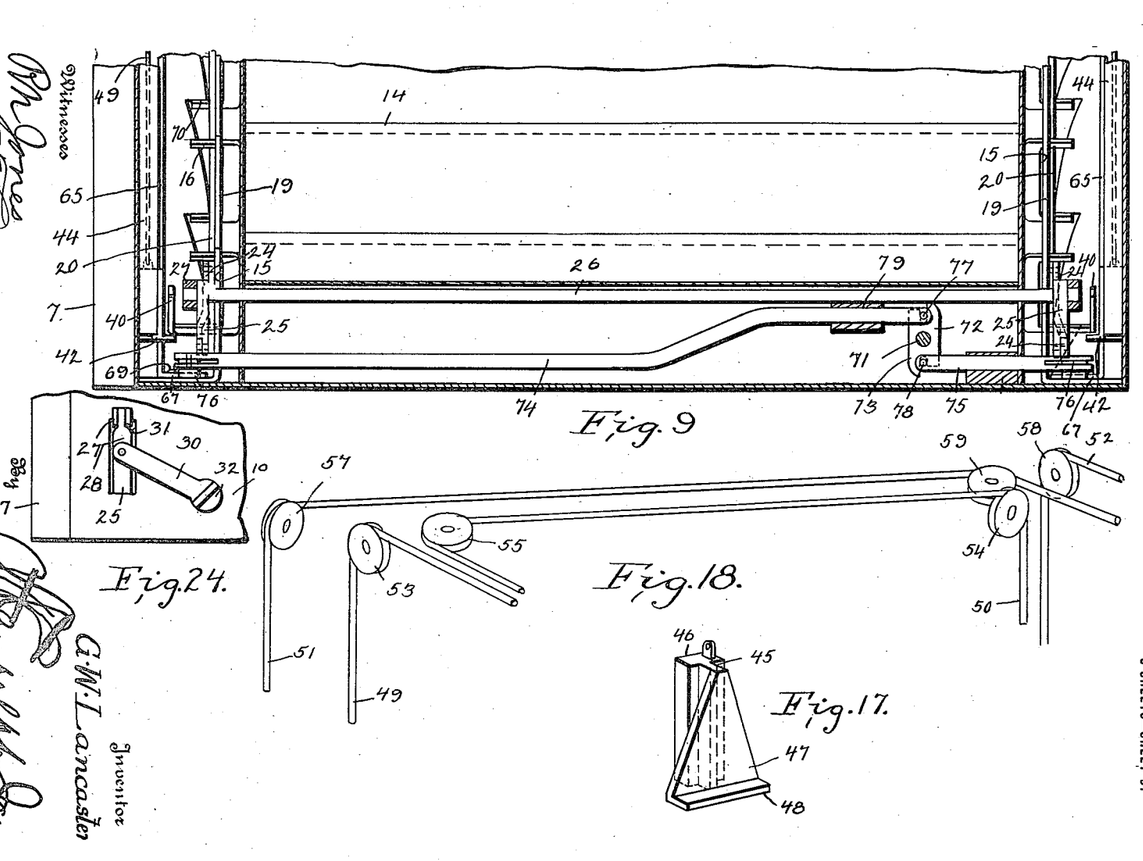
Fig. 9 is a transverse sectional view through the lower portion of the safety shutter.
Fig. 17 is a detail perspective view of one of the vertically slidable shoes.
Fig. 18 is a detail perspective view illustrating the arrangement of the guide pulleys and the operating cords.
Fig. 24 is a detail view of the shaft of the adjusting mechanism.

The vertical guiding and supporting bars or members of the upper and lower series of slats taper upwardly as shown and the distance between the members of each pair or set of shoulders or seats gradually increases from the top of the series to the lower end thereof and the recesses at the ends of the slats are correspondingly formed so that the slats will engage their proper set of shoulders or seats and be supported at the desired points along the bars or members. This will enable the slats to be moved upwardly into close contact with another at the upper ends of the bars or members 16 and 19 and when the slats are released they will drop by gravity in their proper positions for closing the space within the sides and top and bottom of the shutter frame. The lowermost slats of the upper and lower series are provided with arms 39 and 40 which are adapted to be engaged by upper and lower vertically slidable shoes 41 and 42 operating in upper and lower guides 43 and 44. The upper and lower guides are preferably formed by spaced angle bars forming vertical slots or ways for the reception of webs 45 of the slidable shoes which are provided with inner slides 46 and outer supporting brackets 47. The slides 46 are substantially rectangular as clearly shown in Fig. 17 of the drawings and the webs 45 are centrally arranged with relation to the slides 46 and the brackets 47. The brackets 47 are provided at their lower ends with projecting horizontal supporting flanges 48 which extend beneath the arms 39 and 40 of the bottom slats of the upper and lower series. The shoes or carriers are connected with operating means for enabling them to be simultaneously moved upwardly and downwardly, flexible connections such as cords being shown in the accompanying drawings but various other means may of course be employed for this purpose as will be readily understood. The lower shoes or carriers are connected with the lower ends of cords 49 and 50 and the upper slidable shoes or carriers are secured to the lower ends of cords 51 and 52. The flexible connections 49 and 50 are guided by pulleys, 53, 54, and 55 and extend outwardly through a slot 56 located at the top of the casing at one side thereof. The other pair of cords or flexible connections 51 and 52 are guided by pulleys 57, 58, and 59 and extend through a slot 60 located at the opposite side of the top of the shutter frame. The members of the two pairs of operating cords are preferably connected with the exterior chains 61 and 62 having suitable operating handles 63 and 64 preferably in the form of weights as shown. Each pair of cords has one of its members extending across the top of the safety shutter from one side to the other and when one of the operating chains is pulled downwardly or outwardly the shoes with which its cords are connected will be simultaneously raised and the slats coacting with such shoes or carriers will be freely moved and may be easily and quickly moved to their elevated or open positions. Any other suitable arrangement of guide pulleys may of course be employed and the flexible connections may be constructed of any suitable material as will be readily understood. Also the guide pulleys are mounted in suitable brackets as shown and they may be of any desired construction.

In order to enable the slats to be firmly and securely locked in their closed positions, a pair of pivotally mounted angle bars 65 is provided. These angle bars which are formed of two wings or flanges are provided at their upper and lower ends with arms 66 and 67 preferably formed integral with one of the wings or flanges and extending horizontally therefrom and provided with perforations through which pass pivots 68 and 69 to permit one of the flanges or wings of each locking bar to move into and out of engagement with the ends of the slats. Each locking bar has one of its wings extended and notched or recessed to provide a series of shoulders 70 which are adapted to be swung over the ends of the slats whereby the same will be securely locked against the shoulders or seats.

Figure 7:
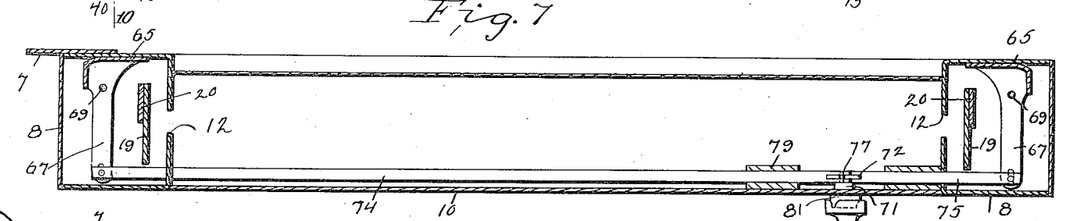
Fig. 7 is a horizontal sectional view on the line 7—7 of Fig. 3.
Figure 8:
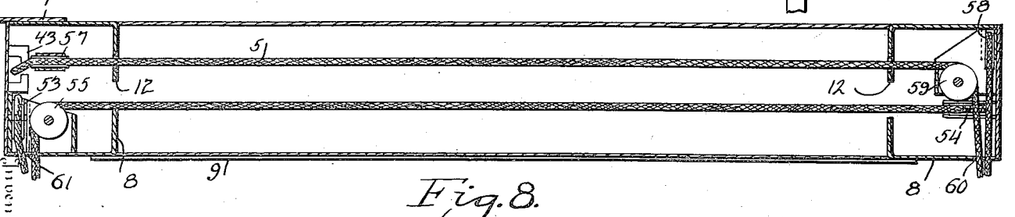
Fig. 8 is a similar view on the line 8—8 of Fig. 3.

The angle locking bars which may be conveniently located adjacent the outer portions of the side casings of the safety shutter frame are simultaneously operated by a shaft 71 journaled in suitable bearings of the bottom portions of the safety shutter frame as clearly illustrated in Fig. 7 of the accompanying drawings and provided at its inner end with oppositely extending arms 72 and 73 projecting upwardly and downwardly and connected by rods 74 and 75 to the lower arms 67. The lower arms 67 are pivoted at their inner portions in vertical alinement with the pivots of the arms 66 and the said lower arms have extensions 76 which are pivotally connected to the outer ends of the said rods 74 and 75. The pivots 77 and 78 which connect the inner ends of the rods 74 and 75 to the arms 72 and 73 are located above and below the shaft 71 and bottom portion or casing of the safety shutter frame is provided with suitable guides 79 and 80 for the rods 74 and 75. The shaft 71 has an outer engaging portion or head 81 which, when the shutter is closed engages with a recessed head 82 of an operating shaft 83 journaled in suitable bearings of the window frame or casing and provided at its outer end with an operating handle 84 having a projection 85 adapted to engage recesses or indentations 86 of a plate or keeper 87. By this construction the locking bars are maintained in and out of engagement with the slats. The locking bars extend the entire length of the safety shutter and their notched or recessed wings or flanges are adapted to engage the entire set of slats. The flanged construction of the locking bars provides a light and at the same time an exceedingly strong locking bar.

Figures 12, 13, 14, 15:
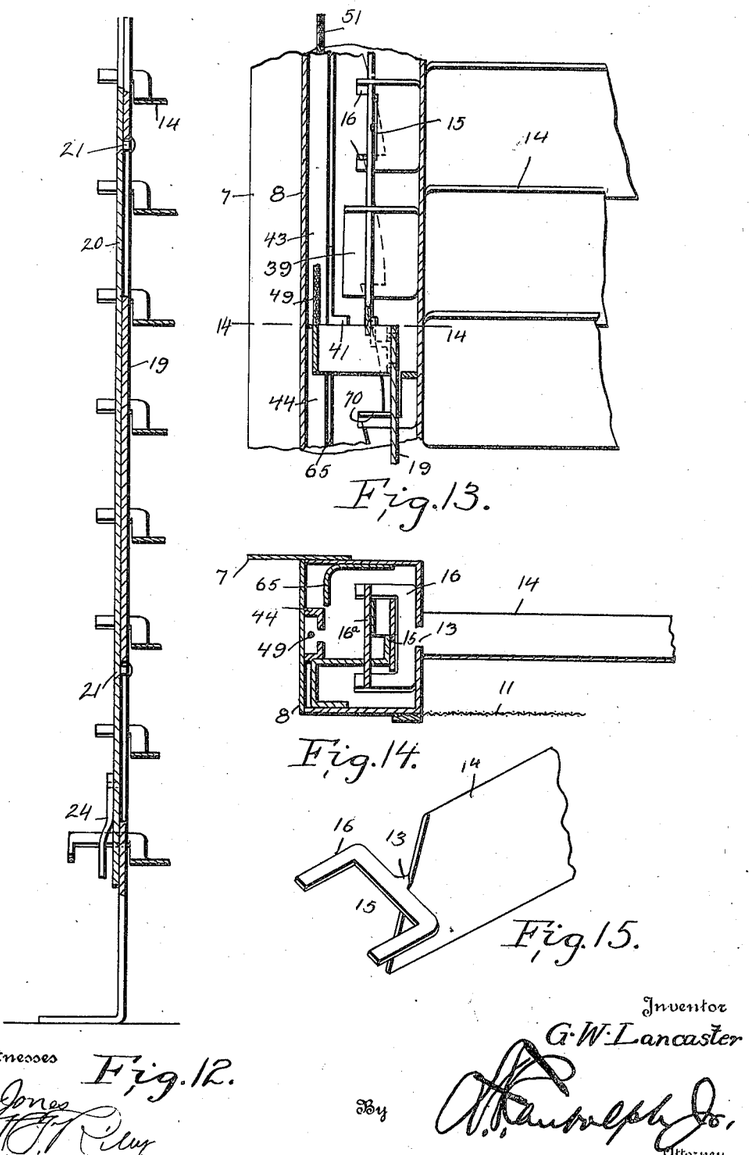
Fig. 12 is a vertical sectional view on the line 12—12 of Fig. 10.
Fig. 13 is an enlarged detail sectional view on the line 13—13 of Fig. 6.
Fig. 14 is a horizontal sectional view of one side of the safety shutter on the line 14—14 of Fig. 13.
Fig. 15 is a detail perspective view of one of the shutter slats.
Figures 20, 21, 22:
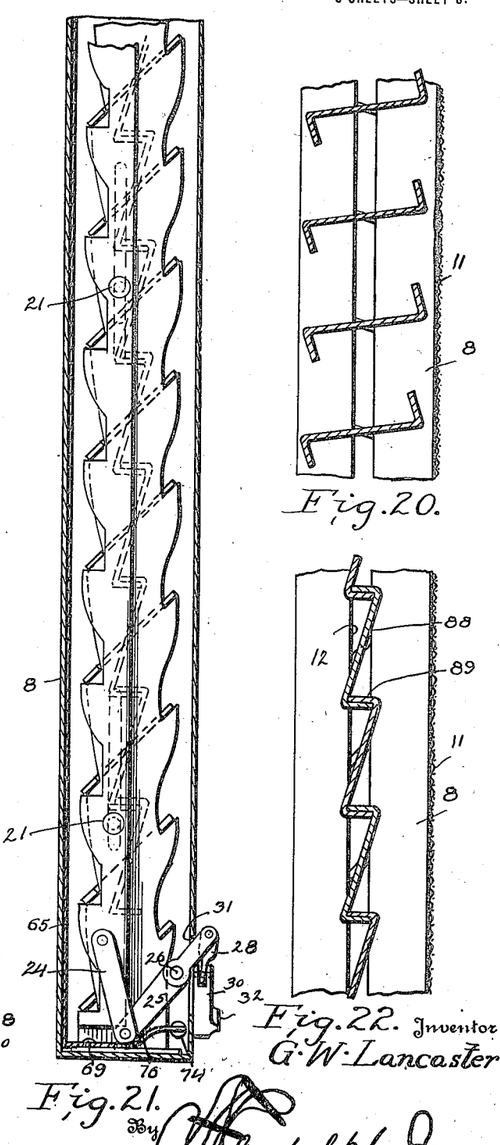
Fig. 20 is a detail sectional view through the slats, the same being open.
Fig. 21 is a vertical sectional view similar to Fig. 19 illustrating the arrangement of the operating mechanism when the slats are closed.
Fig. 22 is a sectional view through the slats showing the same closed.

In Figs. 19 to 22 inclusive is illustrated another form of slat, the slats 88 being substantially Z-shaped and composed of an inclined body portion and upper and lower approximately horizontal flanges 89 which engage with the horizontal flanges of the adjacent slats whereby a tight fire-proof closure or shutter is produced as clearly illustrated in Fig. 22 of the drawings. The Z-shaped shutter slats are adapted to be partially rotated and swung from the position illustrated in Fig. 22 of the drawings to that shown in Fig. 21 to open the slats, the operating mechanism being the same as that heretofore described and shown in Figs. 19 and 21. The flanging of the slats enable them to be entirely closed without changing the relative position of the terminal portions of the slats with relation to the operating mechanism and without laterally twisting the slats and injuring the fiber thereof and materially weakening the slats at the connecting portions. This will be apparent from a comparison of the slats shown in Figs. 19 to 22 inclusive and that illustrated in Fig. 15. In Fig. 15 the body portion of the slat is straight and is arranged at an inclination and would require too much bending of the metal of the slats at the connection portions 13 in order to arrange the body portions of the slats so as to actually touch when the slats are in their closed positions.

Figures 10, 11, 23:
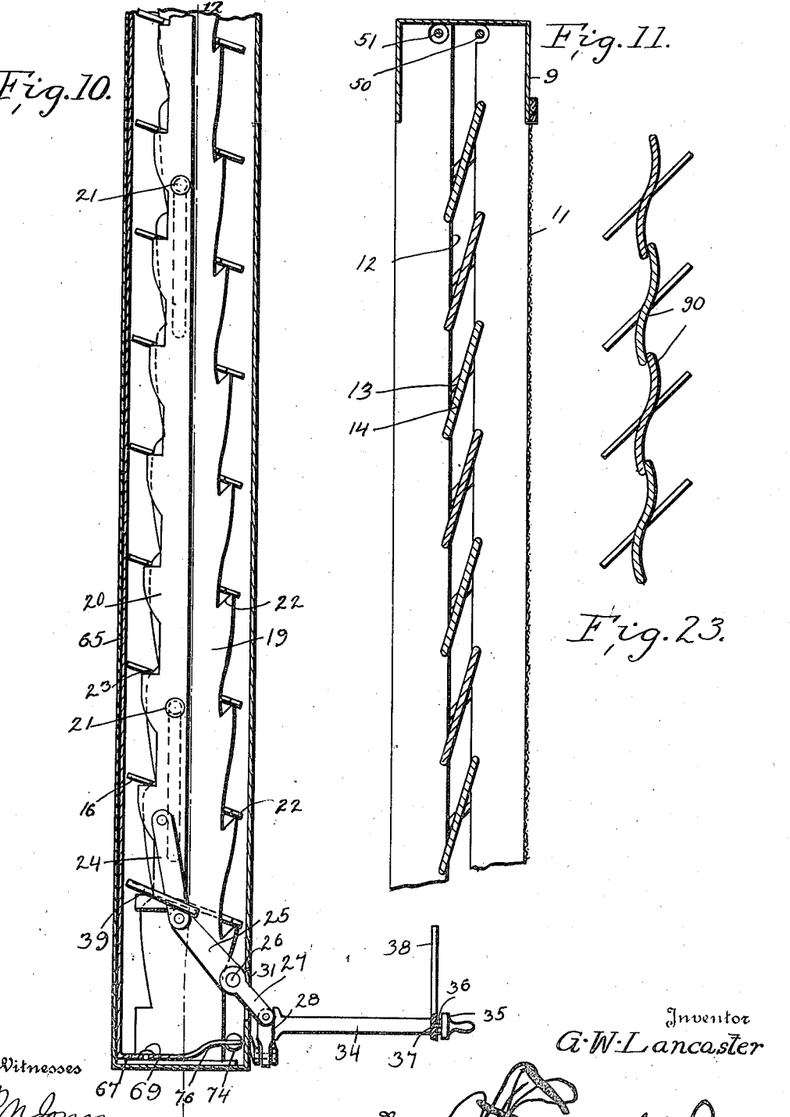
Fig. 10 is a vertical sectional view on the line 10—10 of Fig. 6.
Fig. 11 is a vertical sectional view on the line 11—11 of Fig. 6.
Fig. 23 is a detail sectional view illustrating another form of shutter slat.

In Fig. 23 is illustrated another form of slat. In this figure of the drawing, the slats 90 are sigmoidally curved and approximately S-shaped in cross section so that the upper and lower edges of the slats curve toward one another and are adapted to be brought into contact without twisting the slats to an injurious extent. The slats illustrated in Fig. 23 are adapted to be partially rotated or pivotally adjusted similar to the slats heretofore described to open the slats and arrange them in spaced relation without either raising the slats or opening the safety shutter frame.

What is claimed is:—

1. A safety shutter of the class described comprising a plurality of slats slidable upwardly and downwardly to open and close the shutter, means for supporting the slats at spaced points including seats arranged in pairs and means for adjusting the seats with respect to each other for partially rotating the slats to vary the distance between them.

2. A safety shutter of the class described comprising a plurality of slats slidable upwardly and downwardly to open and close the shutter, vertical bars or members provided with longitudinally shiftable sections, said bars or members and their sections being provided with seats arranged in pairs and supporting the slats at spaced points and means for moving the said sections for partially rotating the slats to vary the space between the same.

3. A safety shutter of the class described comprising a plurality of slats slidable upwardly and downwardly to open and close the shutter, vertical bars or members provided with longitudinally shiftable sections, said bars or members and their sections being provided with seats arranged in pairs and supporting the slats at spaced points, a rock shaft having arms connected with the said sections and means for partially rotating the shaft for moving the sections to partially rotate the slats.

4. A safety shutter of the class described comprising a plurality of slats slidable upwardly and downwardly to open and close the shutter, vertical bars or members provided with longitudinally shiftable sections, said bars or members and their sections being provided with seats arranged in pairs and supporting the slats at spaced points, a rock shaft extending across the safety shutter and provided with inwardly extending arms and having an outwardly extending arm projecting exteriorly of the shutter, means for connecting the inwardly projecting arms with the sections and a shaft provided with an arm connected with the outwardly extending arm of the said rock shaft.

5. A safety shutter of the class described comprising a plurality of slats slidable upwardly and downwardly to open and close the shutter, vertical bars or members provided with longitudinally shiftable sections, said bars or members and their sections being provided with seats arranged in pairs and supporting the slats at spaced points, a rock shaft extending across the bottom of the safety shutter and provided with inwardly extending arms and having an outwardly extending arm, links connecting the inwardly extending arms with the said sections, a shaft arranged at an angle to the rock shaft and having an arm connected with the outer arm of the rock shaft and operating means for partially rotating the last mentional angularly related shaft.

6. A safety shutter of the class described comprising a plurality of slats movable upwardly and downwardly to open and close the shutter and having terminal yokes, vertical bars extending through the yokes and provided with longitudinal sections slidable upwardly and downwardly on the said bars, the bars and the sections being provided with shoulders or seats arranged in pairs, means for actuating the sections to partially rotate the slats, and means for raising and lowering the slats.

7. A safety shutter of the class described comprising a plurality of slats slidable upwardly and downwardly to open and close the shutter, means for normally supporting the slats at spaced points, shoes located at opposite sides of the shutter, the shoes and the lowermost slat having coacting means for engaging each other whereby the shoes are adapted to lift the slats, guides located at opposite sides of the shutter and slidably receiving the shoes and operating means connected with the shoes for raising and lowering the same.

8. A safety shutter of the class described comprising a plurality of slats movable upwardly and downwardly to open and close the shutter, guides located at opposite sides of the shutter, means for normally supporting the slats at spaced points, shoes consisting of slides operating in the said guides, and brackets connected with the slides and provided with means for engaging the bottom slat at the ends thereof and operating means connected with the shoes for raising and lowering the same.

9. A safety shutter of the class described comprising a plurality of slats movable upwardly and downwardly to open and close the shutter, guides located at opposite sides of the shutter, means for normally supporting the slats at spaced points, shoes consisting of slides operating in the guides, brackets provided with projecting supporting flanges and webs connecting the brackets with the slides, arms carried by the bottom slots and arranged to be engaged by the said supporting flanges and means connected with the shoes for raising and lowering the same.

10. A safety shutter of the class described comprising upper and lower series of slats slidable upwardly and downwardly to open and close the shutter, means for normally supporting the slats at spaced points, guides located at opposite sides of the shutter, upper and lower shoes arranged in pairs and provided with means for engaging the ends of the bottom slats of the upper and lower series and operating means connected with the shoes.

11. A safety shutter of the class described comprising upper and lower series of slats slidable upwardly and downwardly to open and close the shutter, means for normally supporting the slats at spaced points, guides located at opposite sides of the shutter, upper and lower shoes arranged in pairs and provided with means for engaging the ends of the bottom slats of the upper and lower series, flexible connections arranged in pairs and having their outer terminal portions located at opposite sides of the shutter and their inner terminal portions connected respectively with the upper and lower shoes and guiding means for the said flexible connections.

12. A safety shutter of the class described comprising a plurality of slats slidable upwardly and downwardly to open and close the shutter, means for normally supporting the slats at spaced points, said means including shoulders or seats and a vertical angle bar pivotally mounted and provided at one of its wings or flanges with means for engaging the slats to hold the same upon the shoulders or seats, said angle bar being movable into and out of engagement with the slats.

13. A safety shutter of the class described comprising a plurality of slats slidable upwardly and downwardly to open and close the shutter, means for normally supporting the slats at spaced points, said means including shoulders or seats and a vertically disposed locking bar pivotally mounted and provided at intervals with recesses forming shoulders movable into and out of engagement with the slats for holding the same on the shoulders or seats.

14. A safety shutter of the class described comprising a plurality of slats slidable upwardly and downwardly to open and close the shutter, means for normally supporting the slats at spaced points, said means including shoulders or seats, a vertically disposed locking bar consisting of an angle bar provided at its ends with integral pivoted arms, said angle bar having one of its wings or flanges recessed at intervals to provide engaging portions, the latter being movable into and out of engagement with the slats to hold the same on the shoulders or seats and operating means connected with the locking bar.

15. A safety shutter of the class described comprising a plurality of slats slidable upwardly and downwardly to open and close the shutter, means for normally supporting the slats at spaced points, said means including shoulders or seats, locking bars located at opposite sides of the shutter and consisting of angle bars provided at their upper and lower ends with arms pivoted to the shutter, the lower arm being extended, said angle bars being recessed at intervals to provide engaging portions which are movable into and out of engagement with the slats, a shaft having opposite arms, rods connecting the arms of the shafts with the extended arms of the locking bars and means for positively rotating the shaft.

16. A safety shutter of the class described comprising a plurality of slats slidable upwardly and downwardly to open and close the shutter, means for normally supporting the slats at spaced points, said means including shoulders or seats, locking bars located at opposite sides of the shutter and consisting of angle bars provided at their upper and lower ends with arms pivoted to the shutter, the lower arm being extended, said angle bars being recessed at intervals to provide engaging portions which are movable into and out of engagement with the slats, a shaft having opposite arms, rods connecting the arms of the shafts with the extended arms of the locking bars, guides receiving the connecting rods, and an operating device for partially rotating the said shaft.

17. A safety shutter of the class described comprising a plurality of slats slidable upwardly and downwardly, the bottom slat being provided with projecting arms, vertical bars located at opposite sides of the shutter and provided with vertically movable sections, said bars and sections being provided with seats arranged at spaced points and normally supporting the said slats, vertically slidable shoes provided with means for engaging the said arms for lifting the slats, means for raising and lowering the shoes, adjusting mechanism connected with the said sections for actuating the same for partially rotating the slats and vertical locking bars pivotally mounted and provided with notched wings or flanges arranged to swing into and out of engagement with the slats to hold the same against movement on the said seats.

In testimony whereof I affix my signature in presence of two witnesses.

GEORGE W. LANCASTER.

Witnesses:
M. INEZ LEWIS,
BENNETT S. JONES.